United States Patent
Bijlani et al.

(10) Patent No.: US 9,718,403 B2
(45) Date of Patent: *Aug. 1, 2017

(54) PERSONALIZED IN-CAR VARIABLE MESSAGE SIGNS

(71) Applicant: International Business Machines Corporation, Armonk, NY (US)

(72) Inventors: Vinod A. Bijlani, Pune (IN); Pamela A. Nesbitt, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/180,049

(22) Filed: Jun. 12, 2016

(65) Prior Publication Data
US 2017/0032672 A1 Feb. 2, 2017

Related U.S. Application Data

(63) Continuation of application No. 14/815,015, filed on Jul. 31, 2015.

(51) Int. Cl.
*B60Q 9/00* (2006.01)
*G06K 9/00* (2006.01)
(Continued)

(52) U.S. Cl.
CPC .............. *B60Q 9/00* (2013.01); *B60W 40/09* (2013.01); *G02B 27/01* (2013.01);
(Continued)

(58) Field of Classification Search
CPC ..... B60Q 9/00; B60W 40/09; G06K 9/00845; G09G 5/30; G08G 1/0962; G02B 27/01
See application file for complete search history.

(56) References Cited

U.S. PATENT DOCUMENTS 5,422,812 A 6/1995 Knoll et al.
8,223,033 B1 7/2012 Paterno
(Continued)

FOREIGN PATENT DOCUMENTS

| GB | 2473517 A | 3/2011 |
| JP | 2007203750 A | 8/2007 |
| WO | 2013101046 A1 | 7/2013 |

OTHER PUBLICATIONS

Office Action for U.S. Appl. No. 14/815,015 (Bijlani et al., "Personalized In-Car Variable Message Signs," filed Jul. 31, 2015), U.S. Patent and Trademark Office, mailed Jul. 26, 2016, 18 pages.
Bensinger, "Car Makers Test Windshield Computer Displays," Wall Street Journal, Dec. 4, 2012, 2 pages.
"Waze, Free Community-based Mapping, Traffic & Navigation App," waze.com, 2009, 5 pages.
(Continued)

*Primary Examiner* — Leon Flores
(74) *Attorney, Agent, or Firm* — VanLeeuwen & VanLeeuwen; Anthony England

(57) ABSTRACT

An approach is provided for selecting variable message signs (VMS). More particularly, this disclosure relates to personalized VMS delivered to a driver of a vehicle via an on-board display. The approach monitors driver behavior to form a driver behavior history and an analytic analysis is applied to the driver behavior history to determine characteristics of the driver. When a wireless notification is received from an external data provider, the notification is modified based on the determined driver characteristics, and the modified notification is displayed to the driver on a display device visible within the vehicle that is being operated by the driver.

6 Claims, 7 Drawing Sheets

(51) Int. Cl.
　　　G09G 5/30　　　(2006.01)
　　　B60W 40/09　　(2012.01)
　　　G02B 27/01　　(2006.01)
　　　G08G 1/09　　　(2006.01)
　　　G08G 1/0962　　(2006.01)
(52) U.S. Cl.
　　　CPC ......... *G06K 9/00845* (2013.01); *G08G 1/091* (2013.01); *G08G 1/0962* (2013.01); *G09G 5/30* (2013.01); *G02B 2027/0141* (2013.01); *G09G 2320/10* (2013.01); *G09G 2380/10* (2013.01)

(56) References Cited

U.S. PATENT DOCUMENTS

2014/0379249 A1　12/2014　Ozturk
2016/0070966 A1　3/2016　Yang et al.

OTHER PUBLICATIONS

"NMRoads.com, Advanced Traveler Information System User Guide," NMRoads.com, May 2012, 11 pages.
"INRIX XD Traffic Maps&Alerts," INRIX, Inc., Feb. 2015, 4 pages.
Li et al., "Personalized Driving Behavior Monitoring and Analysis for Emerging Hybrid Vehicles," Springer Link, Lecture Notes in Computer Science vol. 7319, 2012, Abstract only, 6 pages.
Aguilar, "Harman Wants to Put an Augmented Reality Display in Your Car's Windshield," Gizmodo, Jan. 8, 2013, 3 pages.
Shi et al., "Driving motion capture based driver behavior analysis," 2012 15th International IEEE Conference on Intelligent Transportation Systems (ITSC), Anchorage, Alaska, Sep. 2012, pp. 1166-1171.
Bijlani et al., "Personalized In-Car Variable Message Signs," U.S. Appl. No. 14/815,015, filed Jul. 31, 2015, 36 pages.
"List of IBM Patents or Patent Applications Treated as Related," Letter from Leslie A. Van Leeuwen, Jun. 12, 2016, 1 page.

PERSONALIZED IN-CAR VARIABLE MESSAGE SIGNS

BACKGROUND

Technical Field

This disclosure relates to selecting variable message signs (VMS). More particularly, this disclosure relates to personalized VMS delivered to a driver of a vehicle via an on-board display.

Description of Related Art

Variable Message Signs (VMS) are a tool used in traffic management, alerting drivers to dangers, travel times, missing persons, etc. VMS are generally displayed on large electronic billboard signs visible to drivers as they pass the signs. VMS helps to modify driver behavior by suggesting actions based on current road or weather conditions. Studies in various cities show that 30-80% of drivers respond to VMS messages. These signs perform a vital function of alerting drivers to potentially proximate dangers or hazardous conditions, thus averting many accidents each year.

SUMMARY

An approach is provided for selecting variable message signs (VMS). More particularly, this disclosure relates to personalized VMS delivered to a driver of a vehicle via an on-board display. The approach monitors driver behavior to form a driver behavior history and an analytic analysis is applied to the driver behavior history to determine characteristics of the driver. When a wireless notification is received from an external data provider, the notification is modified based on the determined driver characteristics, and the modified notification is displayed to the driver on a display device visible within the vehicle that is being operated by the driver.

The foregoing is a summary and thus contains, by necessity, simplifications, generalizations, and omissions of detail; consequently, those skilled in the art will appreciate that the summary is illustrative only and is not intended to be in any way limiting. Other aspects, features, and advantages of the present disclosure will be apparent in the non-limiting detailed description set forth below.

BRIEF DESCRIPTION OF THE DRAWINGS

Embodiments of the present invention may be better understood, and its numerous objects, features, and advantages made apparent to those skilled in the art by referencing the accompanying drawings, wherein.

DETAILED DESCRIPTION

Figure 1:
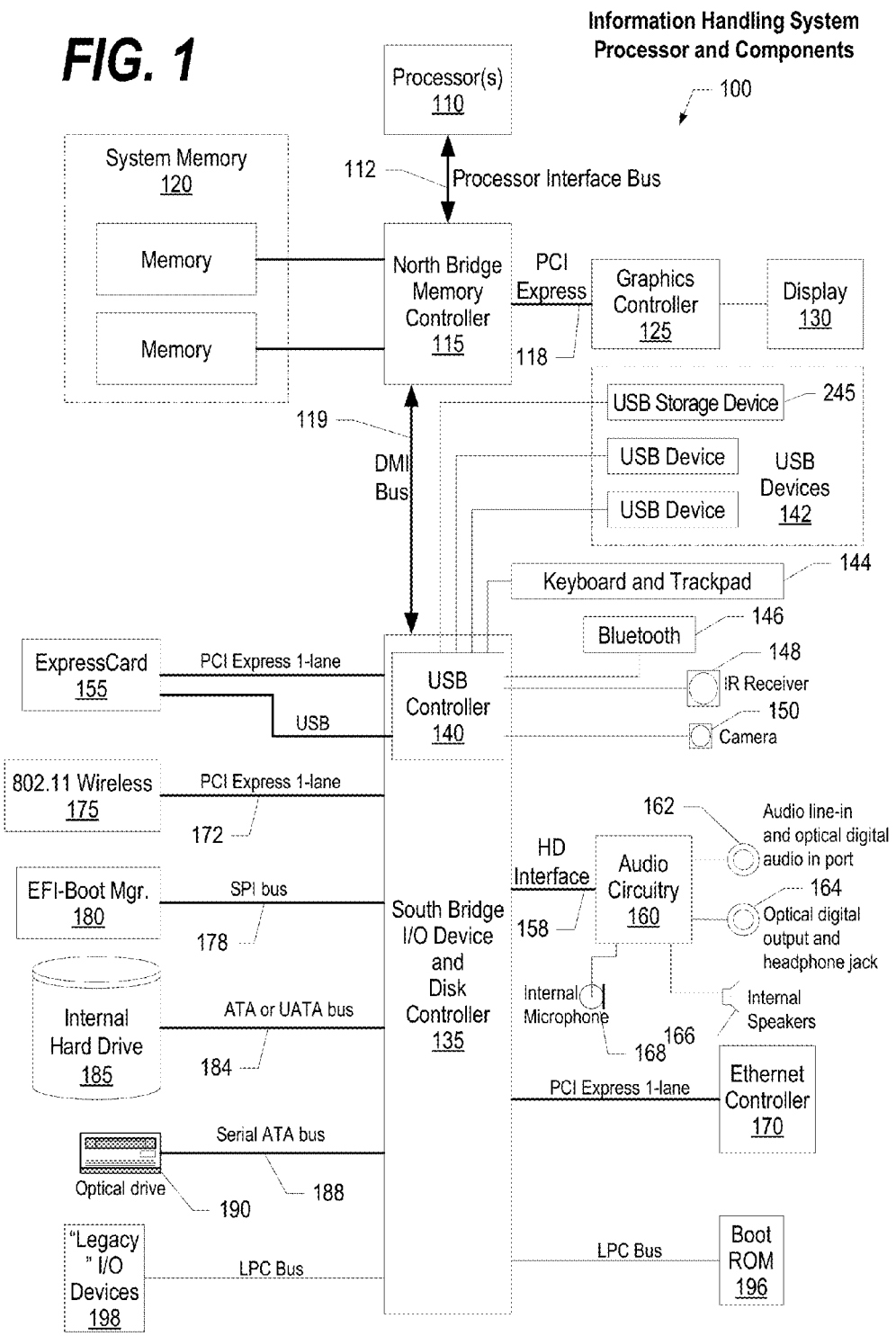
FIG. 1 depicts a block diagram of a processor and components of an information handling system.

Embodiments of the present invention may be a system, a method, and/or a computer program product. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention involve a recognition that existing physical VMS's have the following limitations. First, traditional VMS' messages are "one size fits all" and may be important or irrelevant to an individual driver. For example, a VMS displaying estimated travel time to a location that a driver is not traveling is irrelevant and might be distracting. Because traditional Variable Message Signs are physically installed they become very specific to a location and are only visible to drivers when they are close enough to view the sign. Traditional Variable Message Signs can be obscured from view (e.g., by trucks, other vehicles, etc.), have failing display capabilities (pixels out, jammed, etc), and might be covered with snow or difficult to read due to rain or fog. Furthermore, traditional Variable Message Signs depend on relatively expensive hardware to function properly. The expense of procurement, maintenance, and replacement of the physical equipment throughout its life falls on transportation departments that may be reluctant to buy enough signs due to the upfront cost of each VMS board being from $30,000 to $50,000 depending on the size and display capabilities.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
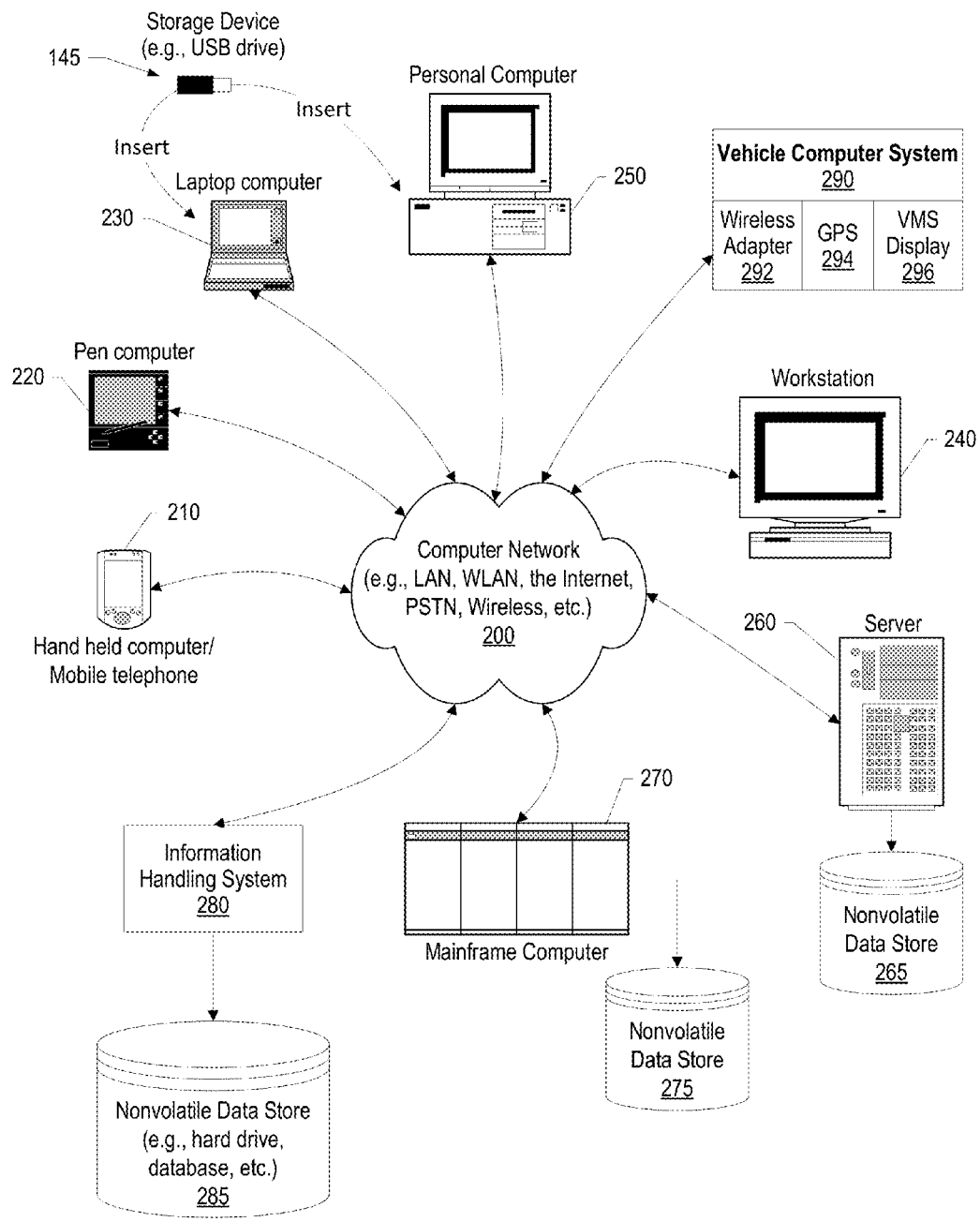
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

To receive Variable Message Signs (VMS) notifications, vehicles are equipped with vehicle computer system 290. The vehicle computer system includes wireless adapter 292 that receives wireless notifications broadcast by data providers. The vehicle computer system also includes global positioning system (GPS) 294 that provides geo-location information to the vehicle computer system. Finally, the vehicle computer system includes display 296 that is used to display modified VMS notifications to the driver of the vehicle in which the vehicle computer system has been installed. The vehicle computer system includes memory, storage, processors, and other computer system components as shown in FIG. 1 for monitoring driver behavior to form a driver behavior history, applying an analytic analysis to the driver behavior history to determine the characteristics of the driver, and modifying the notification based on the determined driver characteristics in order to display the modified notification to the driver on display 296.

FIGS. 3-7 show an approach for improved Variable Message Signs (VMS). This approach eliminates the physical VMS hardware and provides an in-car VMS that provides VMS notifications to the driver in a clear, visible fashion. The approach further personalizes the notifications so that more relevant notifications are provided to the user (e.g., the driver of the vehicle, etc.). Notifications which are not relevant, such as travel times to points beyond the driver's route, are eliminated or minimized. Information of greater importance to the particular would be emphasized. Determination of the importance of the notification to the driver are determined by a number of factors including but not limited to: GPS navigation system identifying current location and planned route, categorization of driver's behavior, driver preferences, driver disabilities, and weather conditions. In one embodiment, in-vehicle computers are utilized to handle display of the VMS.

In one embodiment, the display is the car windshield which will show a personalized notification for the driver in a "heads-up" fashion. Exemplary embodiment of personalized in-car VMS system allows the driver to see notifications specific to the driver's current location and relevant to the planned route of the vehicle. In one embodiment, traffic authorities publish electronic VMS notifications delivered to vehicles in lieu of, or in addition to, posting a traditional VMS sign. In one embodiment, each notification is tagged with geospatial location, such as the road location or mile marker on the roadway where the notification is most relevant. The information provided would be time sensitive for all nearby segments, incidents, weather alerts, etc. Any information which would normally go on a sign would be delivered via the in-car VMS system. Existing technologies, such as traffic management products such as the IBM Intelligent Operations for Transportation™ can be extended to publish this information. In-car VMS systems are wirelessly connected to the publishing unit and store all the information published.

In one embodiment, the in-car computer system would categorize driving behavior (e.g., aggressive, cautious, neutral, etc.). The driver behavior category could be used to affect how the VMS information is displayed to the driver. For example, the system would show a fairly standard notification for the cautious driver, but might provide a highlighted alert notification with a more intensive background color for more aggressive drivers to get the driver's attention, especially when notifying the driver of potentially dangerous or hazardous conditions.

In one embodiment, the in-car VMS system allows the driver to set various personalization settings such as whether to display single or multiple notifications, alerts preferred by the driver over travel time, display all alerts or filter the alerts based on the driver's preference, etc. For example, the system could be personalized regarding how far in advance, based on time or distance, the driver wished to see a notification. Such personalization allow the driver to see the content of a notification well before it might normally be visible on a posted physical sign. The in-car VMS system would identify current location and speed so as to provide the notification at an optimum time.

In one embodiment, the in-car VMS extracts base information from the roadway and traffic systems using the GIS system. The roadway information provides information about the road conditions and other related information such as sharp curves ahead which might be needed to advise the driver to reduce speed. Traffic systems provide information about the current average speed. The system will retrieve traffic and weather data. Based on this information and driver preferences, the system is able to generate notifications applicable to a specific driver.

Figure 3:
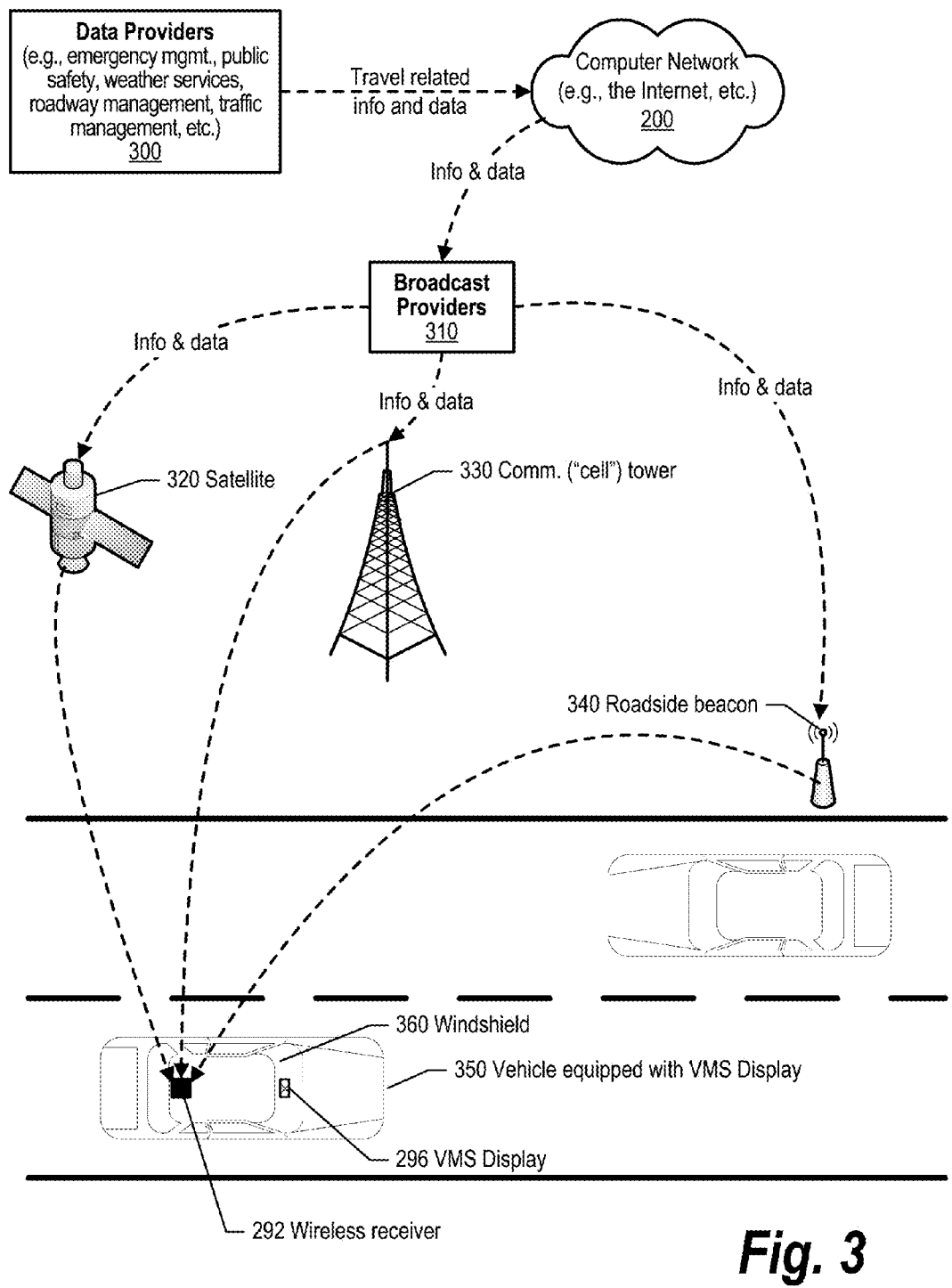
FIG. 3 is a component diagram depicting an exemplary environment utilizing a personalized, on-board Variable Message Sign (VMS)

FIG. 3 is a component diagram depicting an exemplary environment utilizing a personalized, on-board Variable Message Sign (VMS). Data providers 300 provide notification data used in the in-car VMS system. Examples of data providers might include emergency management agencies, public safety agencies, government and private weather services, roadway management organizations, traffic management organizations, and the like. Data providers transmit travel related information and data to broadcast providers 310 via computer network 200, such as the Internet.

Broadcast providers 310 wirelessly transmit VMS notifications to vehicles, such as vehicle 350, with such vehicles being equipped with data receivers and computing systems used to receive, modify, and display the notifications to the drivers of the vehicles. Broadcast providers utilize various equipment and facilities to wirelessly transmit the notification data. This equipment and facilities might include satellite systems 320, communications towers 330 (e.g., cell phone towers, etc.), and roadside beacons 340 which are used to transmit notifications pertaining to an area proximate to the roadside beacon and might be employed in conjunction with traditional VMS signs. The wireless VMS notifications are received at the vehicle's wireless receiver (292) and displayed to the driver of the vehicle on VMS display 296. In one embodiment, the VMS display is a "heads-up" style display that is displayed on a portion of the vehicle's windshield 360.

Figure 4:
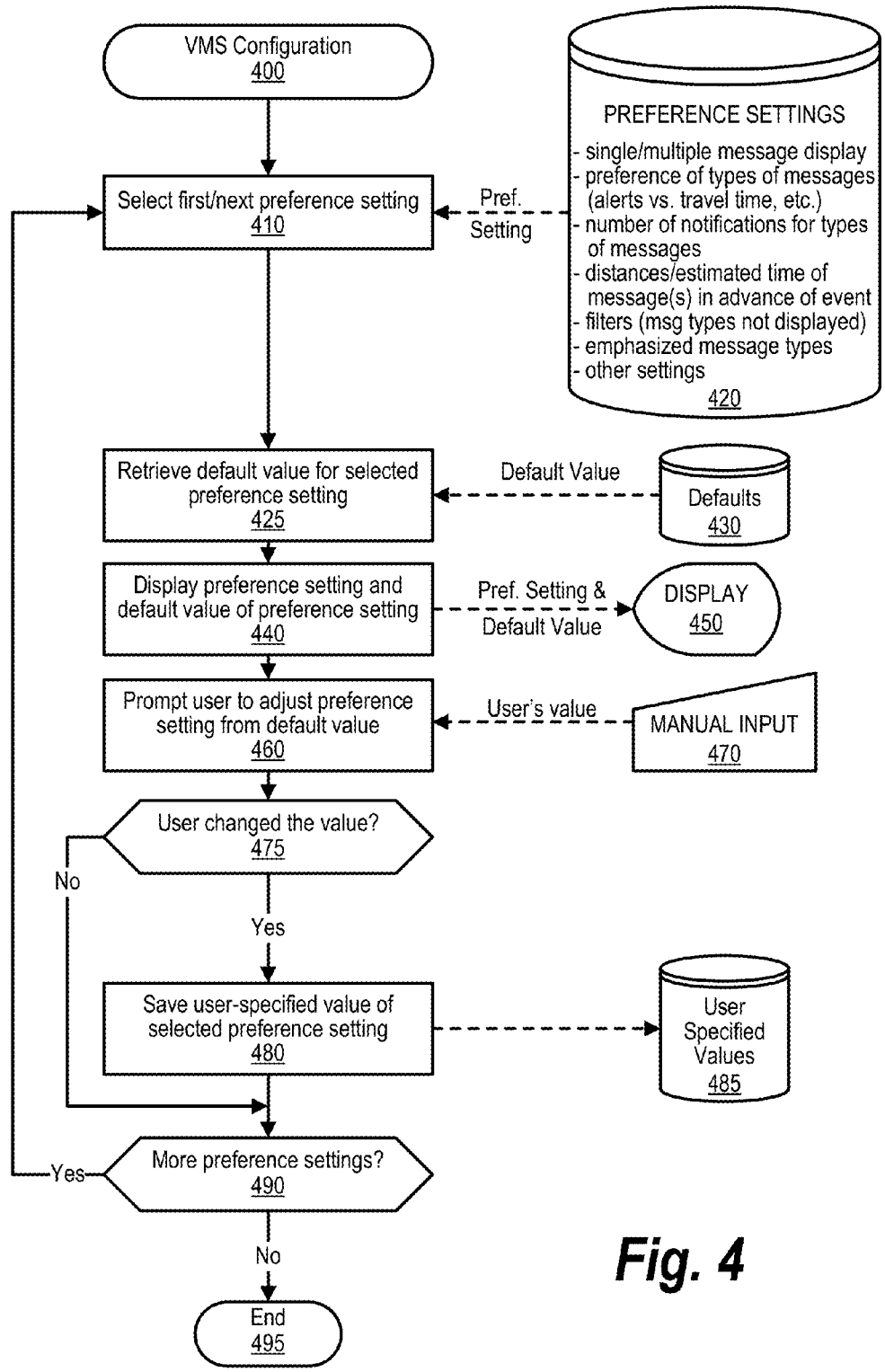
FIG. 4 is a flowchart showing configuration of the on-board Variable Message Sign (VMS)

FIG. 4 is a flowchart showing configuration of the on-board Variable Message Sign (VMS). FIG. 4 processing commences at 400 and shows the steps taken by a process that performs a VMS Configuration to capture user preferences used in the in-car VMS system. At step 410, the process selects the first preference setting. Step 410 retrieves the preference settings from data store 420. Preference settings might include whether the user prefers to view a single notification or multiple notifications, the user's preferences for different types of notifications (e.g., alert notifications vs. travel time notifications, etc.), the number of notifications the user wishes to view based on the type of notification, how far away in terms of distances or estimated time the user wishes to see a notification in advance of an event, filters to apply to notifications (e.g., notification types not displayed, etc.), emphasized notification types, and other notification settings. At step 425, the process retrieves default value for selected preference setting from defaults data store 430. At step 440, the process displays preference setting and default value of preference setting on display device 450. At step 460, the process prompts user to adjust the displayed preference setting from the default value. The system receives the user's adjustment in the form of manual input 470 with the user utilizing an input device such as a keyboard.

The process determines as to whether the user changed the value from the default value (decision 475). If the user changed the value from the default value, then decision 475 branches to the 'yes' branch whereupon, at step 480, the process saves user-specified value of selected preference setting. The user specified value is stored in data store 485. On the other hand, if the user did not change the value from the default value, then decision 475 branches to the 'no' branch bypassing step 480.

The process determines as to whether there are more preference settings to process (decision 490). If there are more preference settings to process, then decision 490 branches to the 'yes' branch which loops back to retrieve and process the next preference setting as described above. This looping continues until there are no more preference settings to process, at which point decision 490 branches to the 'no' branch exiting the loop. The configuration setup processing shown in FIG. 4 thereafter ends at 495.

Figure 5:
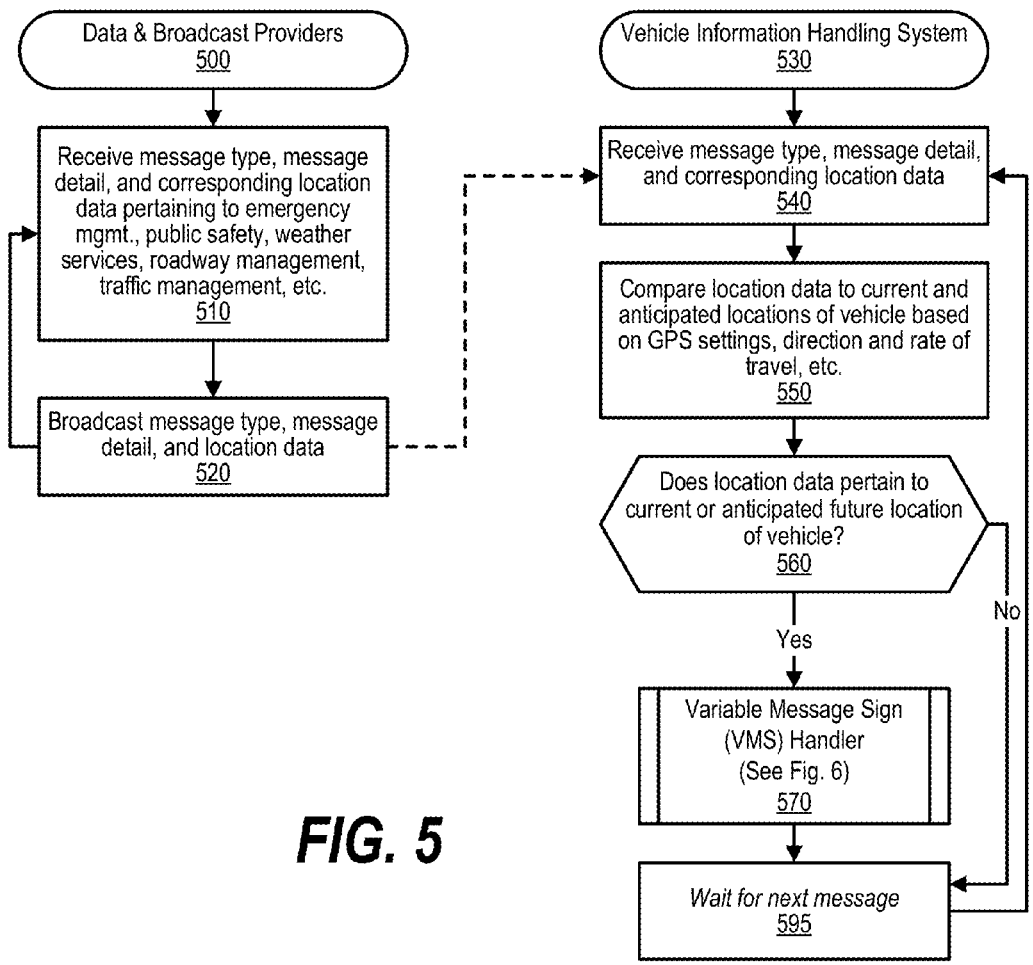
FIG. 5 is a flowchart showing steps taken between the data and broadcast providers and the vehicles utilizing the on-board Variable Message Sign (VMS)

FIG. 5 is a flowchart showing steps taken between the data and broadcast providers and the vehicles utilizing the on-board Variable Message Sign (VMS). Processing performed by data and broadcast providers commences at 500. These steps include steps 510 and 520. At step 510, the performed by data and broadcast providers receives a notification type, notification details, and corresponding location data pertaining to a particular VMS notification. The notification might be an emergency management notification, a public safety notification, a weather services notification, a roadway management notification, a traffic management notification, etc. At step 520, the broadcast provider wirelessly broadcasts the notification type, notification detail, and location data so that the wireless VMS notifications can be received by wireless receivers included in vehicles.

The process performed by the vehicle information handling system commences at 530 and includes steps 540 through 595. At step 540, the vehicle information handling system wirelessly receives the notification type, notification detail, and corresponding location data that was broadcast by the broadcast provider. At step 550, the vehicle information handling system compares the location data included in the notification notification to the current and anticipated locations of the vehicle based on the vehicle's current GPS settings and route, current direction, and rate of travel.

The process determines as to whether the location data in the notification pertains to the current or anticipated future location of the vehicle (decision 560). If the location data in the notification pertains to the current or anticipated future location of the vehicle, then decision 560 branches to the 'yes' branch whereupon, at predefined process 570, the process performs the Variable Message Sign (VMS) Handler routine (see FIG. 6 and corresponding text for processing details). On the other hand, if the location data in the notification does not pertain to the current or anticipated future location of the vehicle, then decision 560 branches to the 'no' branch bypassing predefined process 570.

At step 595, the process waits for next notification to be received from the data and broadcast providers. When the next notification is received, the process loops back to step 540 to process the next notification as described above.

Figure 6:
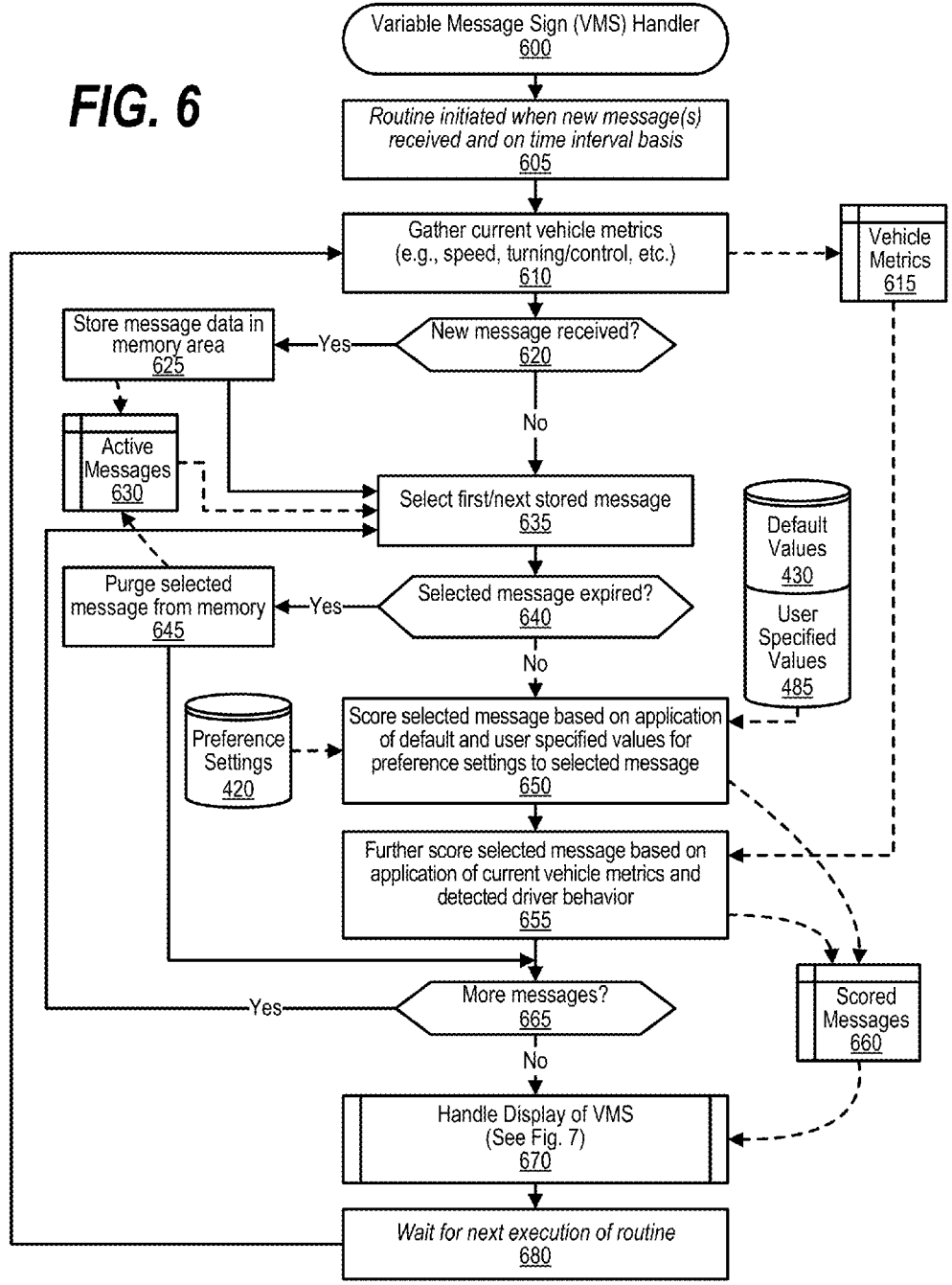
FIG. 6 is a flowchart showing steps taken to handle on-board Variable Message Sign (VMS) messages received at a vehicle's on-board computing system.

FIG. 6 is a flowchart showing steps taken to handle on-board Variable Message Sign (VMS) notifications received at a vehicle's on-board computing system. FIG. 6 processing commences at 600 and shows the steps taken by a process that handles Variable Message Sign (VMS) notifications. At step 605, the process is initiated when new notification(s) received and also on a time interval basis, such as every minute, every five minutes, etc. At step 610, the process gathers current vehicle metrics (e.g., speed, turning/control, etc.). Step 610 stores the current vehicle metrics in memory area 615. The process determines as to whether a new VMS notification has been received at the vehicle (decision 620).

If a new VMS notification has been received at the vehicle, then decision 620 branches to the 'yes' branch whereupon, at step 625, the process stores the received notification data in memory area 630. On the other hand, if a new VMS notification has not been received at the vehicle (instead, the process was executed on the time interval basis), then decision 620 branches to the 'no' branch bypassing step 625.

At step 635, the process selects the first stored notification from memory area 630. The process determines as to whether the selected notification has expired (decision 640). A notification can expire based on the location pertaining to the notification being passed, based on a time period, such as a weather warning expiring, and the like. If the selected notification has expired, then decision 640 branches to the 'yes' branch whereupon, at step 645, the process purges the selected notification from memory area 630. On the other hand, if the selected notification has not yet expired, then decision 640 branches to the 'no' branch bypassing step 645.

At step 650, the process scores the selected notification based on application of default and user specified values for preference settings to selected notification. Step 650 retrieves the preference settings from data store 420, the default values from data store 430, and the user specified values from data store 485. At step 655, the process furthers score selected notification based on application of current vehicle metrics and detected driver behavior. in one embodiment, the driver behavior is determined by monitoring the driver behavior to form a driver behavior history and applying an analytic analysis to the driver behavior history to determine characteristics of the driver. In a further embodiment, the determined characteristics of the driver are further categorized as being either aggressive, cautious, or neutral.

The scores pertaining to the notifications are scored in memory area 660. The process determines as to whether there are more notifications in memory area 630 to process (decision 665). If there are more notifications to process, then decision 665 branches to the 'yes' branch which loops back to step 635 to retrieve, process, and score the next notification from memory area 630. This looping continues until there are no more notifications to process, at which point decision 665 branches to the 'no' branch exiting the loop. At predefined process 670, the process performs the Handle Display of VMS routine (see FIG. 7 and corresponding text for processing details). After the notifications have been displayed, at step 680, the process waits for next execution of routine. When the next execution occurs (either a new notification is received or the time period elapses), then processing loops back to step 610 to restart the procedure.

Figure 7:
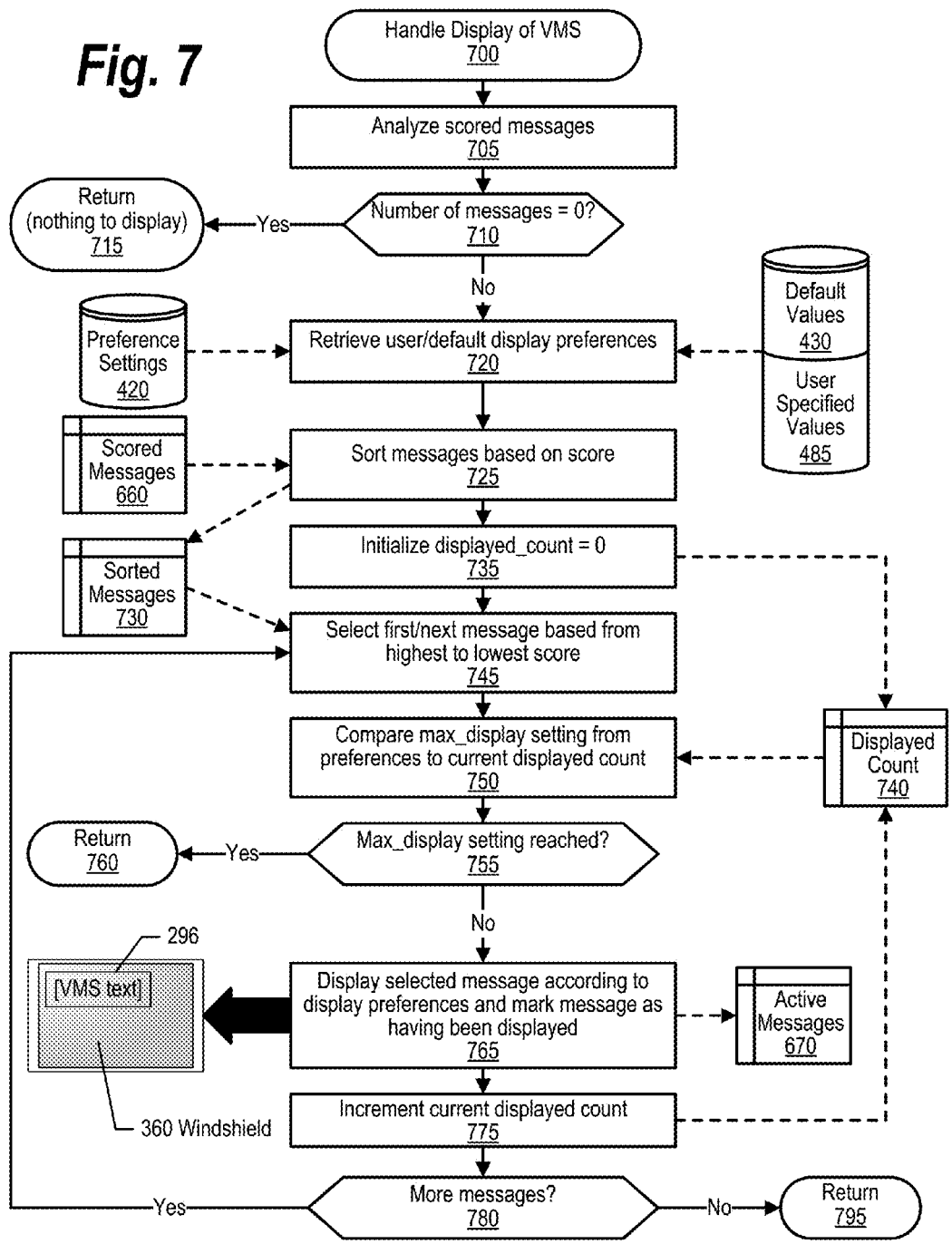
FIG. 7 is a flowchart showing steps taken to display personalized Variable Message Sign (VMS) messages on a display device within a vehicle where they appear to a driver of the vehicle.

FIG. 7 is a flowchart showing steps taken to display personalized Variable Message Sign (VMS) notifications on a display device within a vehicle where they appear to a driver of the vehicle. FIG. 7 processing commences at 700 and shows the steps taken by a process that handle Display of VMS notifications. At step 705, the process analyzes scored notifications found in memory area 660. The process determines as to whether the number of notifications is equal to zero (decision 710). If the number of notifications is equal to zero, then decision 710 branches to the 'yes' branch whereupon FIG. 7 processing returns to the calling routine (see FIG. 6) at 715. On the other hand, if the number of notifications is greater than zero, then decision 710 branches to the 'no' branch for continued processing.

At step 720, the process retrieves user and default display preferences. The preferences are retrieved from data store 420, the default values are retrieved from data store 430, and the user specified values are retrieved from data store 485. At step 725, the process sorts the notifications based on score. The scored notifications are retrieved from memory area 660 and the sorted notifications are stored in memory area 730. At step 735, the process initializes the display counter to zero. The display counter is stored in memory area 740. At step 745, the process selects the first notification from memory area 730 from the highest scored notification to the lowest scored notification. At step 750, the process compares the maximum number of notifications to display setting from the preferences to the current displayed counter.

The process determines as to whether the maximum number of displayed notifications has been reached (decision 755). If the maximum number of displayed notifications has been reached, then decision 755 branches to the 'yes' branch whereupon FIG. 7 processing returns to the calling routine (see FIG. 6) at 760. On the other hand, if the maximum number of displayed notifications has not yet been reached, then decision 755 branches to the 'no' branch and processing continues.

At step 765, the process displays the selected notification according to the display preferences with the displayed notification appearing on VMS display 296, such as in a heads-up display on the vehicle windshield 360. In addition, step 765 further marks the notification as having been displayed by writing data (e.g., display timestamp, etc.) to memory area 670. At step 775, the process increments the current displayed counter. The incremented current display counter is stored in memory area 740.

The process determines as to whether there are more notifications in memory area 730 to process (decision 780). If there are more notifications to process, then decision 780 branches to the 'yes' branch which loops back to step 745 to select the next notification for processing. This looping continues until all notifications have been processed, at which point decision 780 branches to the 'no' branch exiting the loop and returning to FIG. 6 at 795, or until the maximum number of notifications has been displayed, with processing returning to FIG. 6 at return 760.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method executed by an information handling system comprising one or more processors and a memory for managing personalized vehicle variable message signs (VMS), the method comprising:
monitoring driver behavior to form a driver behavior history;
applying an analytic analysis to the driver behavior history to determine characteristics of the driver; and
responsive to wirelessly receiving a plurality of notifications from one or more external data providers, scoring the received notifications based on one or more importance factors, modifying a selected one of the received notifications based on the scoring, and displaying the modified notification to the driver on a display device visible within a vehicle operated by the driver.

2. The method of claim 1 wherein the scoring is partially based on the determined characteristics of the driver, and wherein the determined characteristics of the driver are selected from a group consisting of aggressive, cautious, and neutral.

3. The method of claim 2 further comprising:
identifying a display attribute used in modifying the selected notification wherein the display attribute is based on a combination of the determined driver characteristics and one or more current factors, wherein the current factors are selected from a group consisting of a speed of the vehicle, a current visibility, a current weather condition, an identified obstacle proximate to the vehicle, a risk proximate to the vehicle, a determined distance between the vehicle and an accident identified in the notification, a history of response time by the driver, a driver preference, and an anticipated route of the vehicle.

4. The method of claim 3 wherein at least one of the display attributes is a highlight designed to emphasize the modified notification, and wherein the method further comprises:
identifying an urgency level of the selected notification based one at least one of the current factors and the determined driver characteristics; and
modifying the selected notification with one or more enhanced highlights to emphasize the modified notification in response to identifying a high level of urgency.

5. The method of claim 1 further comprising:
displaying the modified notification on a heads-up display that appears on a windshield surface of the vehicle.

6. The method of claim 1 further comprising:
identifying a driver preference to receive multiple notifications;
displaying a plurality of the received notifications based on the driver preference, wherein an order of display is based on the scoring corresponding to the plurality of received notifications, and wherein each of the received notifications is modified based on the determined driver characteristics and the importance factors associated with each of the received notifications.

* * * * *